(12) United States Patent
Fink et al.

(10) Patent No.: US 8,798,850 B2
(45) Date of Patent: Aug. 5, 2014

(54) METHOD AND MEASUREMENT SYSTEM FOR LOCALIZING AT LEAST ONE WHEEL ON A MOTOR VEHICLE

(75) Inventors: Alexander Fink, Regensburg (DE); Thomas Haas, Donaustauf (DE); Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 951 days.

(21) Appl. No.: 12/555,408

(22) Filed: Sep. 8, 2009

(65) Prior Publication Data

US 2010/0063669 A1 Mar. 11, 2010

(30) Foreign Application Priority Data

Sep. 8, 2008 (DE) .......................... 10 2008 046 271

(51) Int. Cl.
*G01M 17/00* (2006.01)
*G06F 7/00* (2006.01)
*G06F 19/00* (2011.01)

(52) U.S. Cl.
USPC ....... 701/32.1; 701/32.2; 701/32.3; 701/32.4; 701/32.5; 701/32.6; 701/32.7; 701/32.8; 701/32.9

(58) Field of Classification Search
USPC ........................................................... 701/32
See application file for complete search history.

(56) References Cited

U.S. PATENT DOCUMENTS

| 7,392,119 B2 | 6/2008 | Allard et al. |
| 7,768,383 B2* | 8/2010 | Fink et al. ..................... 340/447 |
| 2003/0205081 A1* | 11/2003 | Proschka ......................... 73/146 |
| 2006/0044125 A1* | 3/2006 | Pierbon ......................... 340/442 |

FOREIGN PATENT DOCUMENTS

| DE | 10 2004 034 287 A1 | 2/2006 |
| DE | 10 2004 039 837 A1 | 3/2006 |
| DE | 603 08 213 T2 | 1/2007 |
| EP | 1669221 B1 | 3/2008 |

* cited by examiner

*Primary Examiner* — Maceeh Anwari
(74) *Attorney, Agent, or Firm* — Laurence A. Greenberg; Werner H. Stemer; Ralph E. Locher

(57) ABSTRACT

A method and a measurement system are specified for localizing at least one wheel on a motor vehicle. In this case the operating situation of the motor vehicle and the wheel load of the at least one wheel and/or a variable dependent on this is determined. Then the at least one measured value of the wheel load is compared with a value assigned to the operating situation. As an alternative or in addition, the comparison of at least one parameter dependent on at least two measured values can be undertaken with at least one of the parameters assigned to this operating situation. Finally the point on the motor vehicle at which the wheel is mounted is determined on the basis of the comparison results.

13 Claims, 2 Drawing Sheets

FIG. 3

| aL [m/s²] | aQ [m/s²] | Rla [N] | RLb [N] | RLc [N] | RLd [N] |
|---|---|---|---|---|---|
| 0.5 | 0.0 | 485 | 485 | 515 | 515 |
| 0.5 | 0.5 | 465 | 490 | 510 | 535 |
| 1.0 | 0.0 | 465 | 465 | 535 | 535 |
| 1.0 | 0.5 | 450 | 480 | 520 | 550 |
|  |  |  |  |  |  |
| -0.5 | 0.0 | ... | ... | ... | ... |
| -0.5 | 0.5 | ... | ... | ... | ... |
|  |  |  |  |  |  |
| 0.5 | -0.0 | ... | ... | ... | ... |
| 0.5 | -0.5 | ... | ... | ... | ... |
|  |  |  |  |  |  |
| -0.5 | -0.0 | ... | ... | ... | ... |
| -0.5 | -0.5 | ... | ... | ... | ... |

FIG. 4

| aL [m/s²] | vo | hi | aQ [m/s²] | li | re |
|---|---|---|---|---|---|
| 0.0 | 460 | 520 | 0.0 | 485 | 515 |
| 0.5 | 430 | 550 | 0.5 | 470 | 530 |
| 1.0 | 400 | 580 | 1.0 | 455 | 545 |

METHOD AND MEASUREMENT SYSTEM FOR LOCALIZING AT LEAST ONE WHEEL ON A MOTOR VEHICLE

CROSS-REFERENCE TO RELATED APPLICATION

This application claims the priority, under 35 U.S.C. §119, of German application DE 10 2008 046 271.3, filed Sep. 8, 2008; the prior application is herewith incorporated by reference in its entirety.

BACKGROUND OF THE INVENTION

Field of the Invention

The invention relates to a method for localizing at least one wheel on a motor vehicle. The invention also relates to a measurement system for localizing at least one wheel on a motor vehicle.

Modern motor vehicles frequently have tire pressure control systems or tire information systems available to them, in which sensors built into the tire send various measured values (for example tire pressure, tire temperature, wheel load etc.) to a central receiver unit. In such cases a unique serial number is assigned to the sensors, which is sent at the same time as the measured value, so that the receiver can uniquely assign the measured values to a tire on the basis of the serial number. In such cases it is sufficient for the serial numbers of the serial numbers built into a motor vehicle to be unique. If tires with ambiguous serial numbers are manufactured, this situation would have to be taken into account if necessary when fitting the tire to a motor vehicle.

However a specific fitting position on the vehicle cannot be concluded from the serial number alone, which is why many vehicles are also fitted with a system for wheel localization. The task of localization is to allocate a mounting position to each serial number. This makes it possible as a result to assign measured values to a specific position on the motor vehicle and to provide the driver with appropriate information if a tire (pressure) problem occurs, such as with a warning message "pressure drop left, front". In addition an automatic wheel localization makes it possible to automatically localize a wheel, check the correct mounting of the tires/the wheels on a motor vehicle as well as send a warning to the driver in the event of an error. In such cases both mounting on the correct axle and on the correct side is taken into account. Examples of circumstances which can trigger a warning are mounting of the frequently broader rear tires on the front axle as well as mounting in the incorrect direction of rotation.

SUMMARY OF THE INVENTION

It is accordingly an object of the invention to provide a method and a measurement system for localizing at least one wheel on a motor vehicle which overcome the above-mentioned disadvantages of the prior art methods and devices of this general type, which makes it possible to localize the wheels of a motor vehicle in a simple manner.

Accordingly there is provision, in a method for localizing at least one wheel on a motor vehicle. The method includes:
a) determining an operating situation of the motor vehicle;
b) detecting a wheel load of the at least one wheel and/or a variable dependent thereon;
c) comparing the at least one detected measured value of the wheel load with at least one value assigned to the operating situation and/or comparing at least one parameter dependent on at least two measured values with at least one parameter assigned to the operating situation; and
d) determining a point on the motor vehicle at which the wheel is mounted based on the comparison result.

In addition the following means are provided in an inventive measurement system for localizing at least one wheel on a motor vehicle. Means for determining the operating situation of the motor vehicle. Means for detecting the wheel load of the at least one wheel and/or a variable dependent thereon. Means for comparing at least one measured value with at least one value assigned to the operating situation and/or comparing at least one parameter dependent on at least two measured values with at least one parameter assigned to the operating situation. Means for determining a point on the motor vehicle at which the wheel is mounted based on the comparison result.

By using the wheel load of a wheel and/or of a variable dependent thereon to localize the wheels a parameter is included which is provided in modern vehicles in any event by the on-board electronics. Thus, in all likelihood, no additional sensors need to be built into the motor vehicle, but the existing sensors are advantageously utilized.

It is useful in this context for a variable of the wheel contact area and/or the time taken to pass through the wheel contact area to be used as a variable dependent on the wheel load. If no sensor is possible or desirable for direct measurement of the wheel load, then this load can be calculated afterwards from a plurality of other variables. For example the size of the wheel contact area (also known in German as "Latsch" (tread shuffle)) depends on the wheel load. The same applies for the time taken to pass through the wheel contact area as the wheel rotates.

It is advantageous for the measurement value-dependent parameter to be selected from the group of: a difference in the measured values between at least two wheels, a quotient of the measured value of at least two wheels, a change over time of the measured values of at least one wheel, average values and statistical distribution of the wheel loads or of one of the above parameters and ranking of the wheel loads or of one of the above parameters. Under some circumstances parameters dependent on the measured values can be better suited for localizing a wheel than the measured value itself. For example the difference of the quotient of the measured values of at least two wheels can be determined. In this way changes in the vehicle weight or changes in the center of gravity respectively can be better compensated for. It is also conceivable to use the change over time of a measured value as a parameter. For example during the acceleration of the vehicle there is less load on the front wheels of a vehicle and a greater load on the rear wheels. This additional change is a relatively clear indicator for the localization of a wheel. Furthermore average values or statistical data of the measured values or of the parameters for localization can be used since the measured values, for example when driving through rough terrain or in squally side winds, are subject to strong fluctuations. The influence of these measured value fluctuations on the final result can be reduced by averaging. Finally the ranking of the wheel loads, of parameters, average values and statistical values can be used for localizing the wheels. In a simplified but still robust embodiment of the invention the wheel loads are simply sorted according to their size for example and their ranking is further evaluated. However changes to measured values over time for example can also be advantageously sorted in respect of their size. For example the left front wheel experiences the greatest increase in wheel load in a right hand curve under braking, meaning that it is ranked 1. By contrast the load on the right rear wheel is reduced the most, meaning that it is ranked 4. In this process the assignment of the wheels is decoupled from the processing of absolute values.

It is also advantageous when one or more items from the following group are included as the operating situation: acceleration, braking, negotiating a curve, vehicle stationary, vehicle pulling away at a constant speed or a person getting into or out of the vehicle and one or more parameters from the following group are included as parameters for determining the operating situation: longitudinal acceleration of the motor vehicle, transverse acceleration of the motor vehicle, braking data, vehicle speed, steering wheel angle, gas pedal position, motor data, overall weight of the vehicle, spring travel on a shock absorber assigned to the wheel or force which is applied by a shock absorber assigned to the wheel. Completely "normal" operating situations of a motor vehicle can also be included for localizing the wheels, which enables the inventive method to be executed in the background and completely unnoticed by the driver. A measurement procedure provided separately, which would be likely to be felt to be tedious by the vehicle owners, thus does not have to be executed. The determination of the wheel positions can also be undertaken when the vehicle is stationary if overall weight and center of gravity are known. If these are not known, a person, especially the driver, getting into the vehicle can be used to localize the wheels. In such cases use is made of the fact that when the driver gets into a vehicle, with a usual vehicle construction for Germany, the left front wheel experiences the highest weight gain, the right rear wheel the lowest. To establish which person has got into the vehicle, the weight sensors frequently built into the seats can be used for example. If the passenger gets in, the sensor on the right front seat emits a signal which in turn can be used to trigger the method for wheel assignment. But the behavior gives feedback on the person who has got in. Thus the person getting in is likely to be the driver if the motor is started up shortly after they get in. Measurement when the vehicle is stationary is useful to the extent that in this operating state there are comparatively few influences to disturb the measurement of the wheel loads. It is also especially advantageous to determine the wheel load with conventional, meaning passive dampers from the spring travel if the spring constant of the damper is known, or also to include variables of a regulation for active dampers to determine the wheel load. In this case a measured value of a wheel load which is assigned a specific position on the vehicle is available directly. The wheel loads which are determined with the sensors built into the tire can thus be compared directly with the values determined via the dampers and a wheel position can be derived therefrom. The determination of the wheel load of the wheel load acting on at least one damper is thus equivalent to the determination of the operating situation in step a) of the method.

It is also advantageous if in a first step the axle is determined to which a wheel is attached and in a second step the vehicle side is determined on which a wheel is arranged. The inventive method can thus also be divided into two steps which under some circumstances simplifies the assignment of the wheels. Here the axle on which a wheel is arranged is determined in a first step and the side of the vehicle on which a wheel is arranged is determined in a second step. This sequence can naturally also be reversed. This variant of the invention can especially provide advantages for vehicles with many axles since the assignment of many wheels in a single step is relatively complicated and also prone to errors.

It is especially advantageous if steps b) through d) are only executed when a predetermined operating situation arises.

The opportunity of being able to localize a wheel at any given point in time demands the processing or the storage of a plurality of operating parameters which characterize the respective operating situation. With the usually half-yearly change cycles between summer tires and winter tires for passenger vehicles a wait time is allowed until a predetermined operating situation arises which frequently arises during the operation of a motor vehicle and allows an unequivocal assignment of the wheels is wholly acceptable however.

For example a right-hand curve negotiated at high speed can be provided as the operating situation or a braking maneuver with average deceleration. Of course a number of operating situations can be provided for starting the inventive localization method. In this variant of the invention advantageously only those operating parameters have to be processed or stored which characterize a predefined operating situation, i.e. a predetermined transverse or longitudinal acceleration for example. In this way the number of parameters to be processed/stored can be greatly reduced.

In an inventive measurement system it is also useful for the means for determining the operating situation, the comparison means and the means for determining a point on the motor vehicle at which the wheel is mounted to be arranged in a semiconductor chip and for the detection means to represent at least one input of the latter. Semiconductor chips are small, failsafe and easily available. Therefore it is useful to have the inventive functions running in such a semiconductor chip, such as a microprocessor with a memory. But it is also possible to integrate the inventive method, or the means required for it respectively, into on-board electronics available in any event.

Finally it is useful with an inventive measurement system for this to contain at least one additional sensor for detecting the wheel load of the at least one wheel and/or of a value dependent thereon. The sensors can thus also be seen as belonging to the measurement system. Here in all probability a divided measurement system would make sense, that the sensors are usually arranged in the tires or at a point close to the wheel respectively.

Other features which are considered as characteristic for the invention are set forth in the appended claims.

Although the invention is illustrated and described herein as embodied in a method and a measurement system for localizing at least one wheel on a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 shows a table with wheel loads and operating parameters belonging to different operating situations; and FIG. 4 shows two tables for simplified assignment of wheel loads.

DETAILED DESCRIPTION OF THE INVENTION

Figure 1A:
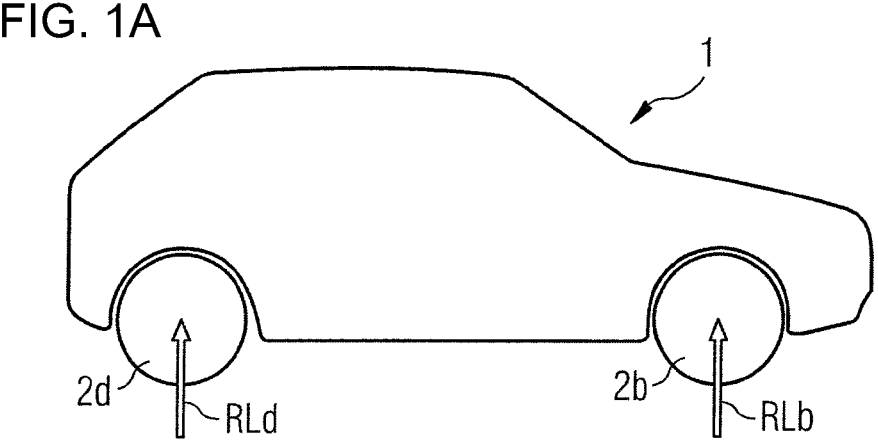
FIGS. 1A and 1B are illustrations of a vehicle with a measurement system from above and from the side according to the invention.

In the figures of the drawing—unless stated otherwise—functionally identical elements and features are provided with the same reference symbols.

Figure 1B:
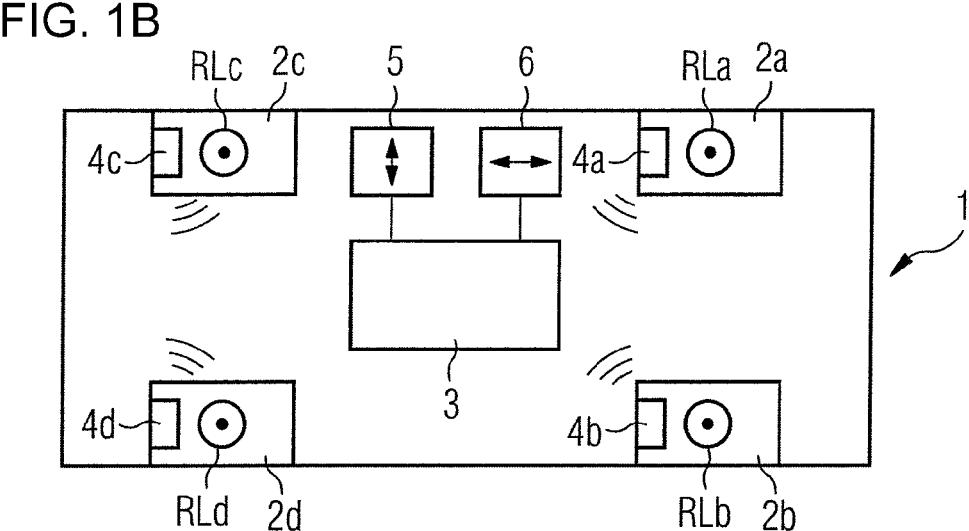

Referring now to the figures of the drawing in detail and first, particularly, to FIG. 1 thereof, there is shown a motor vehicle 1 viewed from above and from the side. The motor vehicle 1 contains four wheels 2a-2d each with assigned wheel load sensors 4a-4d, a measurement system 3 for localizing at least one wheel 2a-2d on the motor vehicle 1 and a sensor for measuring a transverse acceleration 5 as well as a sensor for measuring the longitudinal acceleration 6. Also shown in FIGS. 1A-1B are the force vectors of the wheel load RLa-RLd.

Figure 2:
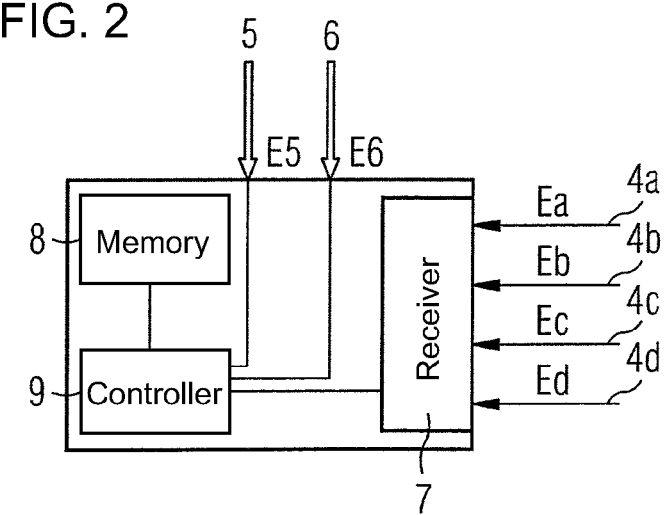
FIG. 2 is a block diagram showing the most important components of the measurement system.

FIG. 2 shows a detailed sketch of a measurement system. The measurement system contains a receiver 7 for detecting the wheel loads RLa-RLd transmitted wirelessly, symbolized with the inputs Ea-Ed, an input E5 for detecting the transverse acceleration aQ as well as an input E6 for detecting the longitudinal acceleration aL. In addition the measurement system 3 contains a memory 8 as well as a microcontroller 9. The memory 8 can be provided among other things for storing the data as well as the execution sequences necessary for the inventive method. As a rule the method will be stored in the form of a program in the memory 8. The microcontroller 9 reads this out and processes the method step by step. The measurement system 3 can also be part of a non-illustrated on-board computer, which also executes other control tasks of the motor vehicle 1. However it is assumed for the sake of simplicity below that the measurement system 3 involves a separate device.

FIG. 3 shows an example of the content of the memory 8 in the form of a table. As well as different value pairs of the longitudinal acceleration aL and of the transverse acceleration aQ which correspond to a specific operating situation, the wheel loads assigned to the operating situation RLa-RLd are stored.

The function of the inventive method, or of the measurement system respectively 3 will now be explained in greater detail with respect to FIGS. 1A to 3. On request or at recurring points in time the measurement system 3 begins to execute the inventive method.

In a first step a) the operating situation of the motor vehicle 1 is determined. To this end the values are read out from the transverse acceleration sensor 5 and the longitudinal acceleration sensor 6. After this the closest values in the table held in the memory 8 for the pair of values determined for the transverse acceleration aQ and the longitudinal acceleration aL are determined. For this example a transverse acceleration aQ of +0.3 m/s$^2$ and longitudinal acceleration aL of 0.9 m/s$^2$ is assumed, which corresponds to the operating state "negotiating a left-hand curve with increase in speed". The pair of values in row four of the table is determined as the pairs of values closest to the stored pair of values.

In a second step b) the wheel loads RLa-RLd of the 4 wheels 2a-2b are read out from the wheel load sensors 4a-4d. In this example it is assumed that the wheel load sensors 4a-4d are built directly into the wheels 2a-2d and transfer their data wirelessly to the receiver 7. To determine the wheel loads RLa-RLd the time taken to pass through the wheel contact area (also known as "Latsch") is measured. With higher wheel load the wheel contact area increases, with lower wheel load it decreases. With known speed the wheel loads RLa-RLd can now be calculated from the given time to pass through the wheel contact area. For the sake of simplicity it is therefore assumed that the wheel load sensors 4a-4d also measure the rotational speed of the wheels 2a-2d and transfer the wheel loads RLa-RLd to the measurement system 3. It is also conceivable for the times to pass through the contact area to be transferred and for the measurement system 3 to determine the wheel loads RLa-RLd with the aid of a vehicle speed notified by the on-board electronics.

In a third step c) the measured wheel loads RLa-RLd are compared with the wheel loads stored in the fourth row of the table. The initially non-assignable values 445 N, 535 N, 560 N and 490 N are present in the measurement system 3, the values in the table are 450 N, 480 N, 520 N and 550 N.

In a fourth step d) it is quickly evident that the wheel with the wheel load 445 N can only be the wheel 2a, the wheel with the wheel load 535 N can only be the wheel 2c, the wheel with the wheel load 560 N can only be the wheel 2d and the wheel with the wheel load 490 N can only be the wheel 2b. In this way the positions of the wheels 2a-2d can be determined.

The table according to FIG. 3 contains positive and negative acceleration values for the longitudinal acceleration aL and the transverse acceleration aQ. In principle however positive values are also sufficient since left-hand curves and right-hand curves and accelerations of the motor vehicle 1 are evenly distributed as a rule. In a command for determining the wheel positions a corresponding operating situation of the motor vehicle 1, here "left-hand curve with increase in speed", would then have to be expected.

With the usually half-yearly change cycles between summer tires and winter tires for passenger vehicles a wait time until such an operating situation arises is entirely acceptable however. The occurrence of a predetermined operating situation is then the trigger for the execution of the second, third and fourth method step b), c) and d). In this case a single table row is actually sufficient which represents a typical operating situation of the motor vehicle 1. For the sake of completeness it should be mentioned at this point that the steps a) to c) do not absolutely have to be executed in the sequence presented.

Instead of a table row per value pair for longitudinal acceleration aL and for transverse acceleration aQ, two separate tables are provided, one for longitudinal acceleration aL and one for transverse acceleration aQ. This case is shown in FIG. 4.

Here only positive values of longitudinal acceleration aL are assigned to the wheel loads on different axles, i.e. "front" vo and "rear" hi and only positive values of the transverse acceleration aQ to the vehicle side, i.e. "left" li and "right" re.

For multi-axle motor vehicles the first table is to be supplemented by entries for each additional axle.

On request the measurement system 3 now begins to execute the inventive method, in which the steps a) to d) are in principle run twice, once for the assignment of the axle and once for the assignment of the vehicle side.

In a first run in the following example a longitudinal acceleration aL of 0.6 m/s$^2$ as well as wheel loads 420 N, 440 N, 540 N and 560 N are determined. With reference to the first table the wheel loads 420 N and 440 N can be assigned to the front axle, the wheel loads 540 N and 560 N to the rear axle.

In a second run in the following example a transverse acceleration aQ of 0.1 m/s$^2$ and wheel loads of 485 N, 510 N, 490 N and 520 N are determined. Based on the second table the wheel loads 485 N and 490 N are assigned to the left side of the vehicle, the wheel loads 510 N and 520 N to the right side.

The wheel load pair 420 N from the first run and 485 N from the second run can thus be assigned to the wheel 2a on the front left. Similarly the wheel load pair 440 N and 510 N can be assigned to the right front wheel 2*b*, the wheel load pair 540 N and 490 N to the left rear wheel 2*c* and the wheel load pair 560 N and 520 N to the right rear wheel.

Until now the value closest to a measured value was always determined in a table. It should be mentioned however for the sake of completeness that an interpolation between the next lower value and the next higher value is also possible.

The examples depict very much idealized operating conditions. In reality the measured values are under some circumstances difficult to allocate because of the highly-dynamic driving processes, which is why other assignment algorithms may be more suitable.

For example the differences in the wheel loads RLa-RLd can be determined and compared with stored values. It is also conceivable for the quotients of the wheel loads RLa-RLd to be determined and compared with the stored values. This is especially worthwhile with varying vehicle weight. It is also conceivable to use a change over time of the wheel loads RLa-RLd for comparison with stored values. For example the wheel loads RLa-RLd can be determined when stationary with a longitudinal acceleration aL=0 and a transverse acceleration aQ=0 and then determined in another operating state. Changes to the weight of the vehicle, its center of gravity can thus be averaged out more easily. Also varying tire pressure, which influences the wheel contact area and also the time to pass through this area, can be averaged out better in this way. It is also conceivable to assign the individual wheel loads RLa-RLd according to size and not to store the wheel load per se in the table but just the index.

It is also conceivable to use a person getting into the vehicle for assigning the wheels 2*a*-2*d*. It is namely very probable that, after the vehicle 1 has been stationary for a long period and is driven off shortly after the person has got into the vehicle, it is the driver who has got in. Normally (depending on the vehicle type) the wheel load RLa on the left front wheel increases the most the load on the right rear wheel the least. Advantageously only a few other influencing variables occur in this operating state, such as the wind blowing. Impacts on the wheel for example are totally excluded in this operating state however, which is why it is an especially simple matter to assign the wheels 2*a*-2*d*.

In the examples shown it has been assumed that a wheel load/the wheel loads or a parameter dependent thereupon are compared with stored values assigned to them. The stored values can in this case be determined empirically or calculated with the aid of models. Naturally the comparison values can however also be calculated at the time. For example the wheel loads on front axle and rear axle are able to be derived from a measured longitudinal acceleration if an appropriate model is available. Storage of wheel load values can especially be dispensed with if these are determined with the aid of the dampers.

The invention claimed is:

1. A method for localizing at least one wheel on a motor vehicle, which comprises the steps of:
   a) determining an operating situation of the motor vehicle;
   b) detecting at least one quantity selected from the group consisting of a wheel load of the at least one wheel and a variable dependent on the wheel load;
   c) obtaining a comparison result by performing at least one step selected from the group consisting of:
      comparing at least one detected measured value of the wheel load with at least one value assigned to the operating situation; and
      comparing at least one parameter dependent on at least two measured values of the wheel load with at least one further parameter assigned to the operating situation; and
   d) determining a point on the motor vehicle at which the wheel is mounted based on the comparison result.

2. The method according to claim 1, which further comprises providing at least one of a size of a wheel contact area and a time taken to pass through the wheel contact area as the variable dependent on the wheel load.

3. The method according to claim 1, which further comprises selecting the parameter, being a measurement value-dependent parameter, from the group consisting of a difference in measured values between at least two wheels, a quotient of the measured values of the at least two wheels, a change over time of the measured values of the at least one wheel, average values, a statistical distribution of the wheel loads, a statistical distributions of one of the above parameters, a ranking of the wheel loads, and a ranking of one of the above parameters.

4. The method according to claim 1, which further comprises:
   selecting the operating situation from the group consisting of acceleration, braking, negotiating a curve, vehicle stationary, vehicle pulling away at a constant speed and a person getting into or out of the vehicle; and
   selecting the further parameter for determining the operating situation from the group consisting of longitudinal acceleration of the motor vehicle, transverse acceleration of the motor vehicle, braking data, vehicle speed, steering wheel angle, gas pedal position, motor data, overall weight of the motor vehicle, spring travel at a damper assigned to the wheel and force which is applied by a damper assigned to the wheel.

5. The method according to claim 1, which further comprises:
   in a first step, determining an axle to which the wheel is attached; and
   in a second step, determining a vehicle side on which the wheel is disposed.

6. The method according to claim 1, which further comprises executing steps b) to d) on an occurrence of a predetermined operating situation.

7. A measurement system for localizing at least one wheel on a motor vehicle, the measurement system comprising:
   a receiver for receiving a signal indicating at least one quantity selected from the group consisting of a wheel load of the at least one wheel and a variable dependent on the wheel load;
   a controller and a memory;
   said memory storing a set of execution sequences that when read out by said controller causes said controller to:
      obtain a comparison result by performing at least one step selected from the group consisting of:
         comparing at least one measured value of the wheel load with at least one value assigned to a current operating situation of the motor vehicle, and
         comparing at least one parameter dependent on at least two measured values with at least one further parameter assigned to the operating situation; and
      determine a point on the motor vehicle on which the wheel is mounted, based on the comparison result.

8. The measurement system according to claim 7, further comprising:
   a semiconductor chip; and
   a pair of acceleration sensors configured to provide signals;

said controller determining the operating situation based on the signals from said pair of acceleration sensors;

said memory and said controller being disposed in said semiconductor chip.

9. The measurement system according to claim 7, further comprising at least one sensor for detecting at least one of the wheel load of the at least one wheel and the variable dependent on the wheel load.

10. The measurement system according to claim 7, wherein at least one of a size of a wheel contact area and a time taken to pass through the wheel contact area is provided as the variable dependent on the wheel load.

11. The measurement system according to claim 7, wherein the parameter, being a measurement-value-dependent parameter, is selected from the group consisting of a difference in measured values between at least two wheels, a quotient of measured values of at least two wheels, a change over time of the measured values of at least one wheel, average values, a statistical distribution of the wheel loads, a statistical distribution of one of the above parameters, a ranking of the wheel loads, and a ranking of one of the above parameters.

12. The measurement system according to claim 7, wherein:

the operating situation is selected from the group consisting of acceleration, braking, negotiating a curve, vehicle stationary, vehicle pulling away at a constant speed, and a person getting into or out of the vehicle; and the further parameter for determining the operating situation is selected from the group consisting of a longitudinal acceleration of the motor vehicle, a transverse acceleration of the motor vehicle, braking data, vehicle speed, steering wheel angle, gas pedal position, motor data, overall weight of the motor vehicle, spring travel at a damper assigned to the wheel, and force which is applied by a damper assigned to the wheel.

13. The measurement system according to claim 7, further comprising:

a pair of acceleration sensors configured to provide signals;

said controller determining the operating situation based on the signals from said pair of acceleration sensors.

* * * * *